United States Patent
Jindal et al.

(12)

(10) Patent No.: US 6,324,580 B1
(45) Date of Patent: *Nov. 27, 2001

(54) LOAD BALANCING FOR REPLICATED SERVICES

(75) Inventors: Anita Jindal; Swee Boon Lim, both of Cupertino; Sanjay Radia, Fremont; Whei-Ling Chang, Saratoga, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/146,848

(22) Filed: Sep. 3, 1998

(51) Int. Cl.$^7$ ............................... G06F 15/16; G06F 9/00
(52) U.S. Cl. ............................................. 709/228; 709/105
(58) Field of Search ................................. 709/223, 232, 709/238, 244, 105, 102, 228; 370/232; 712/27

(56) References Cited

U.S. PATENT DOCUMENTS

| | | | |
|---|---|---|---|
| 5,371,852 | 12/1994 | Attanasio et al. | 395/200 |
| 5,459,837 | 10/1995 | Caccavale | 395/184.01 |
| 5,583,994 | 12/1996 | Rangan | 395/200 |
| 5,742,598 | 4/1998 | Dunn et al. | 370/393 |
| 5,774,660 | * 6/1998 | Brendel et al. | 709/201 |

(List continued on next page.)

FOREIGN PATENT DOCUMENTS

| | | | |
|---|---|---|---|
| 0715257 A1 | 6/1996 | (EP) | G06F/9/46 |
| WO 98/26559 | 6/1998 | (WO) | H04L/29/12 |

OTHER PUBLICATIONS

Colajanni, M., Yu, P. and Dias, D., Analysis of Task Assignment Policies in Scalable Distributed Web–Server Systems, IEEE Transactions on Parallel and Distributed Systems, vol. 9, No. 6, Jun. 1998, pp. 585–599.

Pending, U.S. Patent Application Serial No. 09/146,771, by Anita Jindal, et al., titled "System for Responding to a Resource Request," filed Sep. 3, 1998, with Attorney Docket No. SUN–P3317–JTF.

Pending U.S. Patent Application Serial No. 09/146,772, by Anita Jindal, et al., titled "Load Balancing in a Network Environment," filed Sep. 3, 1998, with Attorney Docket No. SUN–P3374–JTF.

Primary Examiner—Zarni Maung
Assistant Examiner—Jason D. Cardone
(74) Attorney, Agent, or Firm—Park, Vaughan & Fleming LLP (57) ABSTRACT

A method is provided for load balancing requests for a replicated service or application among a plurality of servers operating instances of the replicated service or application. A policy is selected for choosing a preferred server from the plurality of servers according to one or more specified status or operational characteristics of the servers, such as the least-loaded or closest server. The policy is encapsulated within multiple levels of objects or modules that are distributed among the servers offering the replicated service and a central server that receives requests for the service. Status objects gather or retrieve information concerning the specified status or operational characteristic(s) of each of the plurality of servers. An individual server monitor object operates for each instance of the replicated service to invoke one or more status objects and receive the necessary information. A central replicated monitor object receives the information from each individual server monitor object. The information from the servers is analyzed to select the server having the optimal status or operational characteristic(s). An update object updates the central server, such as a domain name server, to indicate the preferred server. Requests for the replicated service are then directed to the preferred server until a different preferred server is identified.

30 Claims, 5 Drawing Sheets

U.S. PATENT DOCUMENTS

| | | | |
|---|---|---|---|
| 5,774,668 | * 6/1998 | Choquier et al. | 709/223 |
| 5,790,789 | 8/1998 | Suarez | 395/200.32 |
| 5,870,561 | * 2/1999 | Jarvis et al. | 709/238 |
| 5,881,238 | 3/1999 | Aman et al. | 395/200 |
| 5,894,556 | 4/1999 | Grimm et al. | 395/200 |
| 5,915,095 | 6/1999 | Miskowiec | 395/200 |
| 5,937,165 | 8/1999 | Schwaller et al. | 395/200 |
| 5,938,732 | 8/1999 | Lim et al. | 709/229 |
| 5,991,809 | * 11/1999 | Kriegsman | 709/226 |
| 6,038,599 | 3/2000 | Black et al. | 709/223 |
| 6,052,718 | * 4/2000 | Gifford | 709/219 |

* cited by examiner

LOAD BALANCING FOR REPLICATED SERVICES

BACKGROUND

This invention relates to the field of computer systems. More particularly, a system and methods are provided for load balancing among replicated services using policies.

In many computing environments, clients such as computer systems and users connect to computer servers offering a desired service—such as electronic mail or Internet browsing. One computer server may, however, only be capable of efficiently satisfying the needs of a limited number of clients. In such a case, an organization may employ multiple servers offering the same service, in which case the client may be connected to any of the multiple servers in order to satisfy the client's request.

A service offered simultaneously on multiple servers is often termed "replicated" in recognition of the fact that each instance of the service operates in substantially the same manner and provides substantially the same functionality as the others. The multiple servers may, however, be situated in various locations and serve different clients. In order to make effective use of a replicated service offered by multiple servers (e.g., to satisfy clients' requests for the service), there must be a method of distributing clients' requests among the servers. This process is often known as load balancing.

In one method of load balancing, clients' requests are assigned to the servers offering the replicated service on a round-robin basis. In other words, client requests are routed to the servers in a rotational order. Each instance of the replicated service may thus receive substantially the same number of requests as the other instances. Unfortunately, this scheme can be very inefficient.

Because the servers that offer the replicated service can be geographically distributed, a client's request may be routed to a relatively distant server, thus increasing the transmission time and cost incurred in submitting the request and receiving a response. In addition, the processing power of the servers may vary widely. One server may, for example, be capable of handling a larger number of requests or be able to process requests faster than another server. As a result, the more powerful server may periodically be idle while the slower server is overburdened.

In another method of load balancing, specialized hardware is employed to store information concerning the servers offering the replicated service. In particular, this method stores information, on a computer system other than the system that initially receives client requests, about which of the servers has the smallest load (e.g., fewest client requests). Based on that information a user's request is routed to the least-loaded server. In a web-browsing environment, for example, when a user's service access request (e.g., a connection request to a particular Uniform Resource Locator (URL) or virtual server name) is received by a server offering Domain Name Services (DNS), the DNS server queries or passes the request to the specialized hardware. Based on the stored information, the user's request is then forwarded to the least-loaded server offering the requested service.

This method is also inefficient because it delays and adds a level of complexity to satisfying access requests. In particular, one purpose of a DNS server is to quickly resolve a client's request for a particular service to a specific server (e.g., a specific network address) offering the service. Requiring the DNS server to query or access another server in order to resolve the request is inefficient and delays the satisfaction of the request.

In yet other methods of balancing requests among multiple instances of a replicated service, client requests are randomly assigned to a server or are assigned to the closest server. Random assignment of client requests often results in requests being routed to geographically distant servers or servers that are more burdened than others, thus resulting in unnecessary delay. Assigning requests to the closest server is also inefficient because a faster response may be available from a server that, although further from the client, has less of a load.

In addition to the above disadvantages of present load balancing techniques, present techniques are limited in scope. For example, in the methods described above, load-balancing decisions are made solely on the basis of operational statistics concerning the servers offering a replicated service, not the status of the service itself. In other words, present techniques do not provide for the collection or consideration of information concerning the status of individual applications or services executing on the servers. Thus, a client's request for a particular application or service may be routed to a first server that has less of an overall load than a second server, even though the specific application request could be more efficiently and/or rapidly handled by the second server.

SUMMARY

In one embodiment of the invention a system and methods are provided for balancing client (e.g., user) requests among multiple instances of a replicated service or application in accordance with a selected policy. In this embodiment, instances of the replicated service execute on separate computer servers.

A load balancing policy is selected to specify one or more factors to be used in determining the server (e.g., one of multiple servers offering a replicated service) that is to receive a client request. The identity of the "preferred" server is periodically updated in order to distribute requests for the service or application among the multiple servers. Illustrative policies include selecting the least-loaded or closest server. Illustratively, the least-loaded server is the server having the shortest response time or fewest pending client requests and the closest server is the server that can be reached in the fewest network hops or connections.

Depending upon the selected policy, status objects or modules are created to collect information from each server offering the replicated service or application that is being load-balanced. The information collected from each server may include the number of requests held and/or processed by the server or service, the response time and/or operational status (e.g., is it up or down) of the server or service, the distance (e.g., the number of network hops) to the server, etc.

Each instance of a replicated service or application is associated with its own status object(s). In one embodiment of the invention multiple status objects having different functions are associated with one instance. Each instance of the replicated service is also associated with an individual monitor object (IMO) or module. Each IMO thus collects and saves information from the status object(s) of one service instance. Illustratively, the IMO queries its status object(s) on a periodic basis and stores the information that is returned.

A replicated monitor object (RMO) or module is employed to collect information from the IMOs associated with the various instances of the replicated service. The RMO stores this information, which is then processed to identify a preferred server (e.g., least-loaded or closest).

In an embodiment of the invention in which clients access the replicated service through a system such as a Domain Name Service (DNS) server, a DNS updater object or module updates a DNS zone file to identify the preferred server (e.g., by its network address). A DNS zone file may be used to resolve a virtual server name (e.g., a virtual identity of a service replicated on multiple servers) to a particular server. When a client requests a replicated service accessed via a virtual name, the DNS server directs the request to the server indicated in the zone file.

In one embodiment of the invention the status objects, IMOs, the RMO and the DNS updater are co-located (e.g., on a DNS server). Illustratively, the servers and replicated services need not be modified in this non-intrusive mode of operation. The status objects use network functions or commands (e.g., Ping, Connect) to retrieve operational and load information concerning a server (e.g., the response time of a server, whether a server or service is up or down). In an alternative embodiment of the invention an intrusive mode of operation is enabled in which the status object(s) and IMOs execute on individual servers that operate instances of a replicated service or application. In this alternative embodiment the RMO and DNS updater may remain on the DNS server.

In another alternative embodiment of the invention a specialized object or module other than a DNS updater is generated to act upon the selection of a preferred server. In this alternative embodiment, the specialized object is configured to update data structures or otherwise cause the direction or re-direction of load-balanced requests to the preferred server.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, illustrative embodiments of the invention are described in the context of browsing the worldwide web or other Internet content and services. These embodiments of the invention therefore involve the use of Domain Name Services (DNS) to resolve access requests to virtual server names into addresses of physical machines such as computer servers. One skilled in the art will appreciate that a DNS server may therefore be used to balance or distribute requests among multiple web or Internet servers. One skilled in the art will also recognize that the present invention is not limited to such an environment but may be readily adapted to other environments in which load balancing is required for a replicated service or application program.

The program environment in which a present embodiment of the invention is executed illustratively incorporates a general-purpose computer or a special purpose device such a hand-held computer. Details of such devices (e.g., processor, memory, data storage and display) are well known and are omitted for the sake of clarity.

It should also be understood that the techniques of the present invention might be implemented using a variety of technologies. For example, the methods described herein may be implemented in software running on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. In addition, although specific embodiments of the invention are described using object-oriented software programming concepts, the invention is not so limited and is easily adapted to employ other forms of directing the operation of a computer.

In a present embodiment of the invention, information concerning the operation of computer servers executing a replicated service is collected and processed to identify a preferred server (e.g., the server with the smallest load or shortest response time). Illustrative pieces of information that are collected include a server's response time, its distance from a central server (such as a name server providing DNS services), its operational status (e.g., whether it is up or down), etc.

For purposes of the present invention a replicated service is a service (e.g., web browsing, electronic mail) that is available on multiple servers. For example, an organization providing a service or application that is visited or invoked by numerous clients may employ several web servers to handle the requests. Each of the several servers is considered to operate a separate instance of the replicated service or application. Individual users may thus be routed to, and their requests satisfied by, any of the several servers.

The collected information is then analyzed and a preferred server is identified in accordance with a selected policy. In accordance with one illustrative policy, the preferred server is the server that is least-loaded. Another policy identifies the preferred server as being the closest server. After the preferred server is identified, subsequent requests for the replicated service or application are directed to that server. For example, in a web-browsing environment a DNS lookup table, or zone file, is updated to indicate that requests for the replicated service are to be routed to the preferred server.

The information described above is collected, and a new preferred server identified, on a regular or periodic basis. By periodically changing the preferred server, client requests are load-balanced between the participating servers.

In an alternative embodiment of the invention, load balancing is still performed among applications or replicated services receiving multiple client requests, but the information used to identify a preferred server or preferred instance of the application relates to the application rather than the server. In this alternative embodiment, for example, a database application may be modified to track statistics such as the number of users being serviced by each instance of the application or the number of access requests that are pending with each instance. Requests may then be balanced among the instances by comparing the load handled by each one and, for example, selecting the server having the least-loaded instance (e.g., the instance having the fewest incomplete requests) to receive new requests.

Figure 1:
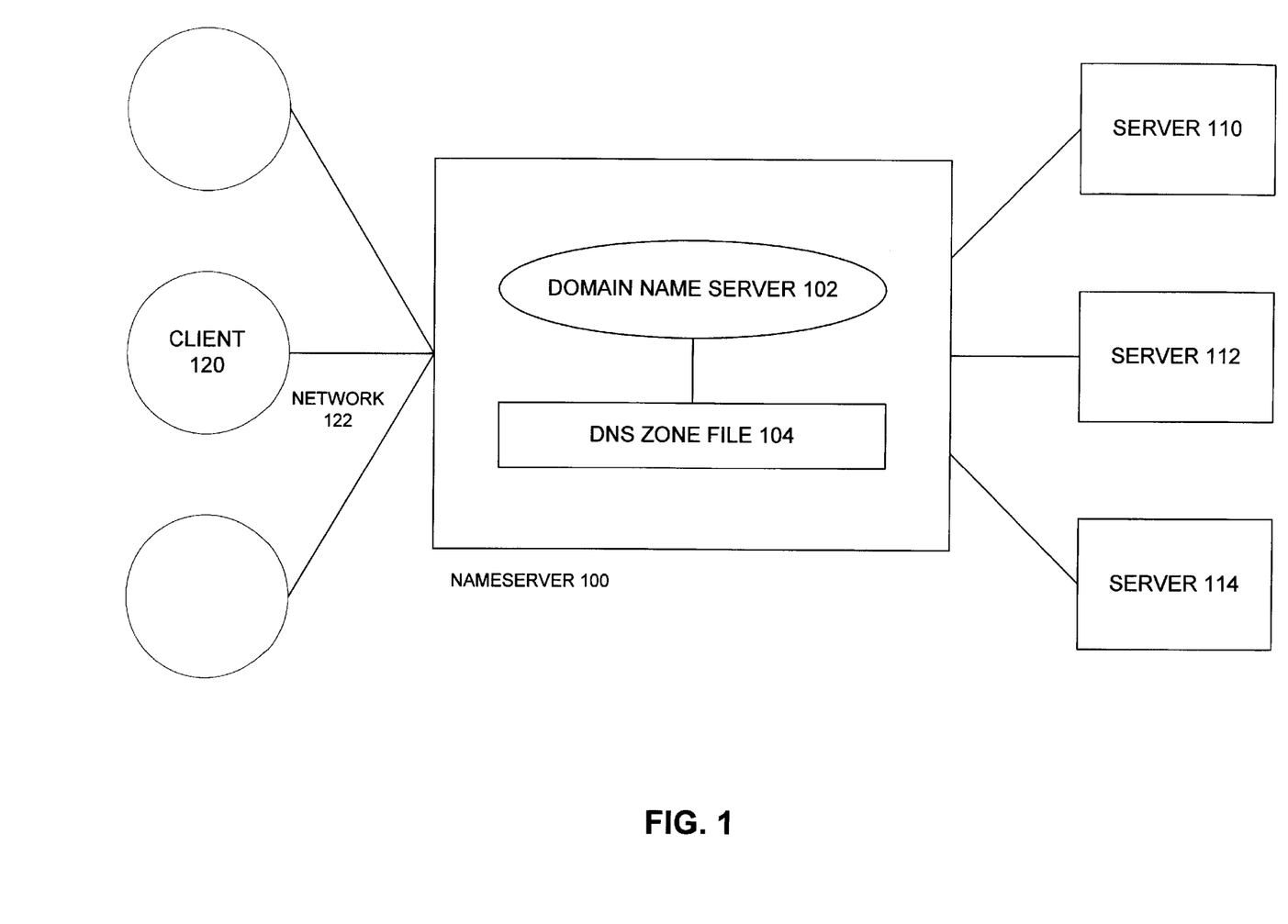
FIG. 1 is a block diagram depicting an illustrative environment in which an embodiment of the present invention may be implemented to load balance client requests among multiple servers.

FIG. 1 is a block diagram depicting an illustrative environment in which an embodiment of the invention may be implemented to balance web browsing access requests to an internet service among multiple web servers. Illustratively, names 100 is a computer offering Domain Name Services (DNS) with DNS 102. Back-end servers 110, 112 and 114 are web servers offering a replicated Internet service.

Nameserver 100 includes zone file 104, which is used to resolve requests for the replicated service to an address of a server offering the requested service. Zone file 104 thus includes an entry for a virtual server name (e.g., www.sun.com) that is exposed to clients such as client 120, to allow them access to the replicated service on server 110, server 112 or server 114. At different times, the entry for www.sun.com will indicate a network address (e.g., an IP or Internet protocol address) for one of servers 110, 112 and 114. Servers 110, 112 and 114 may be dispersed or proximate to one another (e.g., geographically or logically).

Client 120 is illustratively a personal computer or workstation configured to provide a user access to a network (e.g., the Internet) and various applications and services on servers 110, 112 and 114. Client 120 is thus coupled to nameserver 100 via network 122 and includes instructions (e.g., a web browser) for communicating via network 122. Client 120 further includes common components such as a processor, memory, storage, input and output devices, etc. Such common components are well known to those skilled in the art and are omitted from FIG. 1 for the purpose of clarity.

In the environment of FIG. 1, when client 120 directs its web browser to access a replicated service that is exposed to clients via a virtual server name, the access request is received by nameserver 100. Nameserver 100, through DNS 102, identifies a server to handle the request. In particular, DNS 102 accesses zone file 104 and retrieves a network address of a server offering the replicated service. Therefore, in FIG. 1, an IP (Internet protocol) or other network address of one of servers 110, 112 and 114 is returned.

In one embodiment of the present invention, the specific server identified in the zone file is determined according to a selected policy, as discussed below. Further, the server identified in zone file 104 is updated from time to time in accordance with the selected policy in order to distribute client requests among the servers offering the replicated service.

In an alternative embodiment of the invention, instead of returning an address of a server, the DNS lookup in zone file 104 returns an identifier (e.g., file name) of a set of executable instructions. The executable instructions are executed, illustratively by nameserver 100, in order to perform a variety of actions (e.g., load or mount an alternate Internet or domain namespace).

In a present embodiment of the invention information reflecting the status or operation of servers 110, 112 and 114 is collected and analyzed in accordance with the selected policy to identify a "preferred" server to be exposed to clients via zone file 104. The various pieces of information that may be collected illustratively include: whether a server or instance of a replicated service is operational; the response time for a request submitted to a server or service instance; the number of requests processed by or pending on a server or service instance, a server's proximity (e.g., the number of network hops necessary to reach the server from nameserver 100), etc. In one embodiment of the invention, a series of computer-readable instructions are executed to collect, assemble and analyze the various pieces of information and to update DNS zone file 104.

Advantageously, the computer-readable instructions take the form of executable objects or modules. The objects or modules are illustratively created in a suitable programming language or script and then configured and installed on nameserver 100. In alternative embodiments of the invention, the executable objects or modules are distributed among nameserver 100 and servers 110, 112 and 114.

Figure 2:
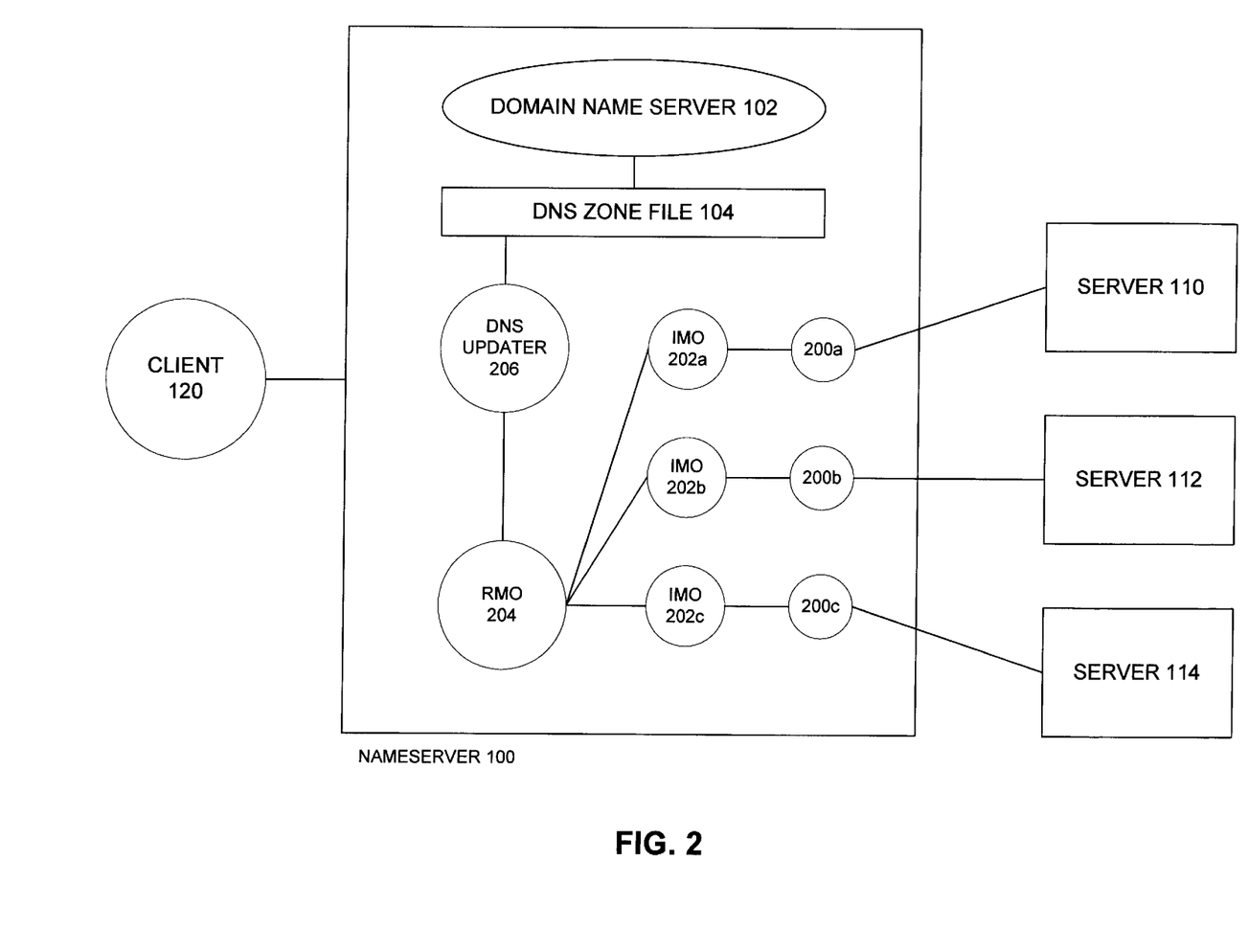
FIG. 2 is a block diagram depicting a method of balancing client requests among multiple servers in a non-intrusive manner in accordance with an embodiment of the present invention.

FIG. 2 depicts an illustrative non-intrusive embodiment of the invention in which operational and statistical information is collected from servers 110, 112 and 114 and analyzed on nameserver 100 using executable objects installed on nameserver 100.

In this mode of operation, status objects 200a, 200b and 200c are invoked on nameserver 100 for the purpose of gathering information from servers 110, 112 and 114, respectively. The configuration and purpose of the status objects depend upon the policy that has been selected for choosing a preferred server. For example, where the selected policy requires choosing the least-loaded server (e.g., that which has the fastest response time), each status object measures the response time of its associated server. Illustratively, this may be accomplished by issuing a Ping (or similar) command to the server and measuring the response time. As another example, where the selected policy requires choosing the closest server the status object is illustratively configured to measure the number of hops from nameserver 100 to the object's associated server.

In yet another embodiment of the invention, status objects 200a, 200b and 200c are configured to determine whether a particular service (e.g., web service, electronic mail service), application program or server is operational. Illustratively, the status objects in this embodiment issue a Connect (or similar) command to the target service or server. If a Connect command is successful the issuing object knows that the target is operational, otherwise it is assumed to be inoperative.

Illustratively, for each replicated service (or application) that is to be monitored (i.e., that is subject to load balancing) on a server, a separate status object operates on nameserver 100. In addition, each status object illustratively performs a single function (e.g., determine response time, determine a server's distance from nameserver 100). In alternative embodiments of the invention, however, a single status object may monitor multiple servers or services and/or perform multiple functions.

In FIG. 2, individual monitor objects (IMO) 202a, 202b and 202c also reside and execute on nameserver 100. A separate IMO is depicted for each instance of the replicated service. In particular, IMOs 202a, 202b and 202c invoke and collect information from status objects 200a, 200b and 200c, respectively. Individual monitor objects may also be known as server monitor objects. Although FIG. 2 depicts only one status object associated with each IMO, depending upon the selected load-balancing policy (e.g., the criteria for choosing a preferred server), multiple status objects may be associated with an IMO. In such an environment, the IMO will invoke and/or collect information from each associated status object.

In the presently described embodiment, different types of status objects are invoked with differing degrees of regularity. When the active status objects collect the servers' response times, for example, IMO 202a may collect information from status object 200a relatively frequently (e.g., every 60 seconds) to determine the response time of server 110. In contrast, when the active status objects reflect a policy preferring the closest server, IMO 202b may invoke status object 200b only occasionally (e.g., once per day) because the distance from nameserver 100 to server 112 is unlikely to change very often.

Although each IMO is associated with only one status object in the illustrated embodiment, in an alternative embodiment of the invention an IMO may invoke and collect data from multiple status objects. In this alternative embodiment, for example, an IMO may invoke one status object to determine the response time of a server or service and another status object to determine whether the server is operational (i.e., whether the server is up). Illustratively, the Ping command is used to determine whether a server is operational. If the server does not respond to the Ping command, it may be assumed to be down.

Replicated monitor object (RMO) 204 retrieves the information collected by status objects from each IMO associated with one replicated service or application. Therefore, in the illustrated embodiment where each of servers 110, 112 and 114 operate a separate instance of a replicated service (e.g., web browsing), RMO 204 collects data from IMOs 202a, 202b and 202c. If the servers also offered another replicated service (e.g., electronic mail) or application, a second RMO would illustratively operate on nameserver 100 for the purpose of retrieving information concerning that service from a different set of IMOs. A replicated monitor object may also be known as a central monitor object due to its coordination role on behalf of a central server (e.g., nameserver 100) receiving multiple requests for a replicated service or application.

Thus, for each replicated service or application for which load balancing is performed in accordance with present embodiments of the invention, a status object collects load and/or operational information from each server executing an instance of the service or application. In addition, an IMO exists for each instance of the replicated service and an RMO operates for each service or application.

The data collected by RMO 204 from the various IMOs is analyzed in accordance with the selected policy and a preferred server is identified. As discussed above, the preferred server may, for example, be the one having the fastest response time (and which is thus likely to be the least-loaded server) or the one closest to nameserver 100. Illustratively, RMO 204 maintains a data structure (e.g., array, vector, table, database) identifying each server and/or instance of the replicated service that is being load-balanced, along with one or more values or other indicators or summaries of the collected information concerning each server (or service instance).

Finally, in the illustrated embodiment DNS updater object 206 gathers and analyzes data from RMO 204 and updates zone file 104 after the collected information is analyzed and a preferred server is selected. In this embodiment, RMO 204 retrieves the collected data and DNS updater 206 updates the zone file on a periodic basis. Illustratively, if the selected policy specifies the use of the closest server, RMO 204 and DNS updater 206 need not take action as often as they do when the policy requires the use of the server with the fastest response.

Figure 3:
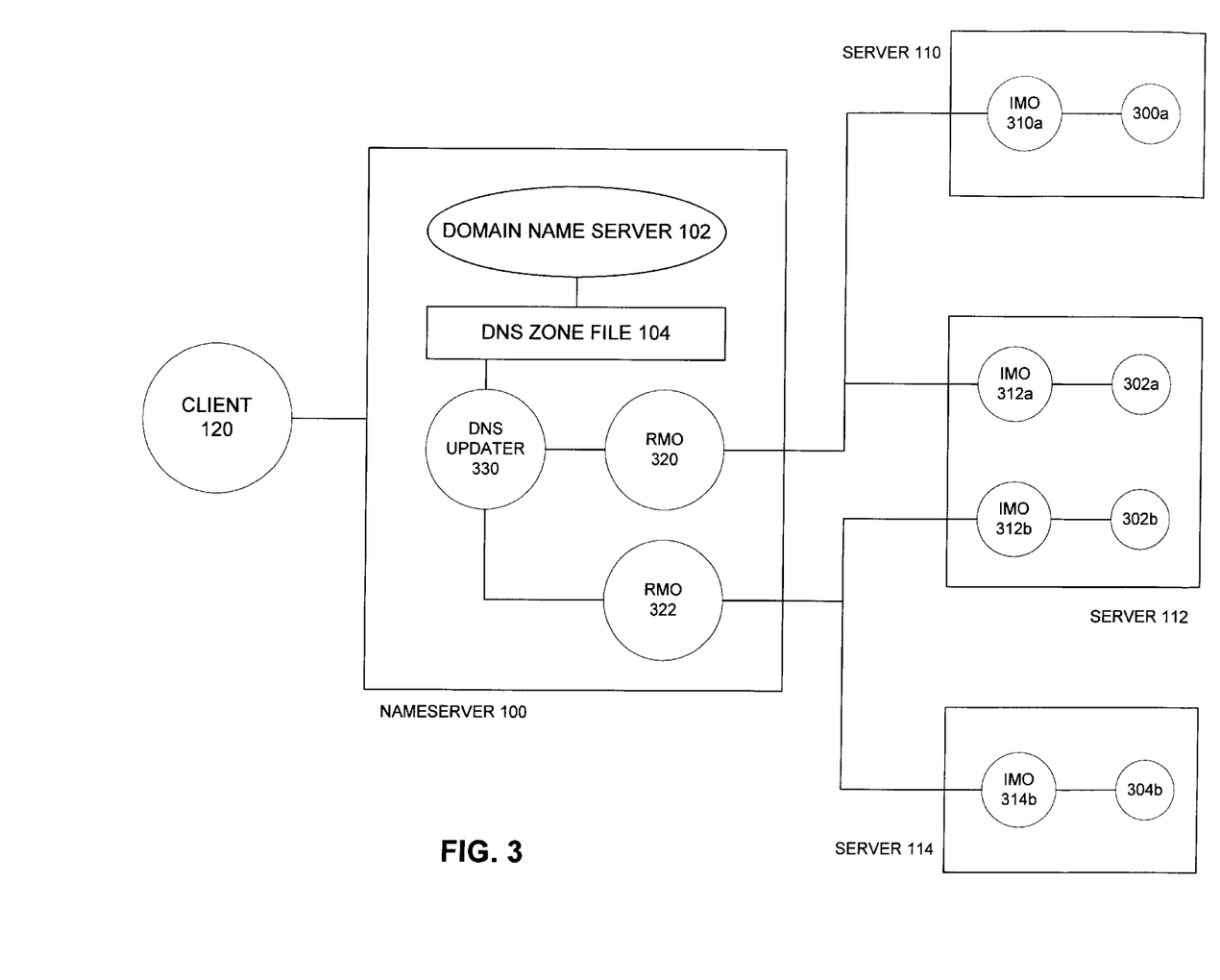
FIG. 3 is a block diagram depicting a method of balancing client requests among multiple servers in an intrusive manner in accordance with an embodiment of the present invention.

FIG. 3 depicts an illustrative embodiment of the invention employing an intrusive mode of operation. In this mode of operation, status objects and individual monitor objects reside and execute on the servers operating a replicated service or application.

In FIG. 3, two replicated services or applications are offered among servers 110, 112 and 114. Thus, status objects 300a and 302a collect load and/or operational data concerning a first replicated service (e.g., web browsing) or application, while status objects 302b and 304b collect load and/or operational data concerning a second replicated service (e.g., electronic mail) or application.

Each server also operates an IMO for each resident instance of a replicated service for the purpose of receiving data from one or more status objects associated with the IMO. For example, FIG. 3 depicts IMO 312a coupled to status object 302a and IMO 312b coupled to status object 302b on server 112. Thus, in the embodiment of the invention depicted in FIG. 3, status objects and IMOs reside on individual servers that are being load-balanced, but perform substantially the same functions as in the embodiment depicted in FIG. 2.

Replicated monitor object 320 interfaces with IMOs 310a and 312a and RMO 322 interfaces with IMOs 312b and 314b to retrieve the necessary information concerning the replicated services. Various means of communication may be employed between the RMOs and IMOs. In a present embodiment of the invention Object Request Broker (ORB) technology is employed. In an alternative embodiment of the invention Remote Procedure Call (RPC) technology is used.

DNS updater 330 also resides on nameserver 100 in the presently described embodiment and operates in substantially the same manner as described above. After the data concerning each instance of each replicated service is retrieved and analyzed, DNS updater 330 updates the DNS zone file to reflect the preferred server for each replicated service. Illustratively, one DNS updater is used to update the zone file for all replicated services being load-balanced. However, in an alternative embodiment of the invention separate DNS updaters may be employed for each replicated service or application.

Figure 4:
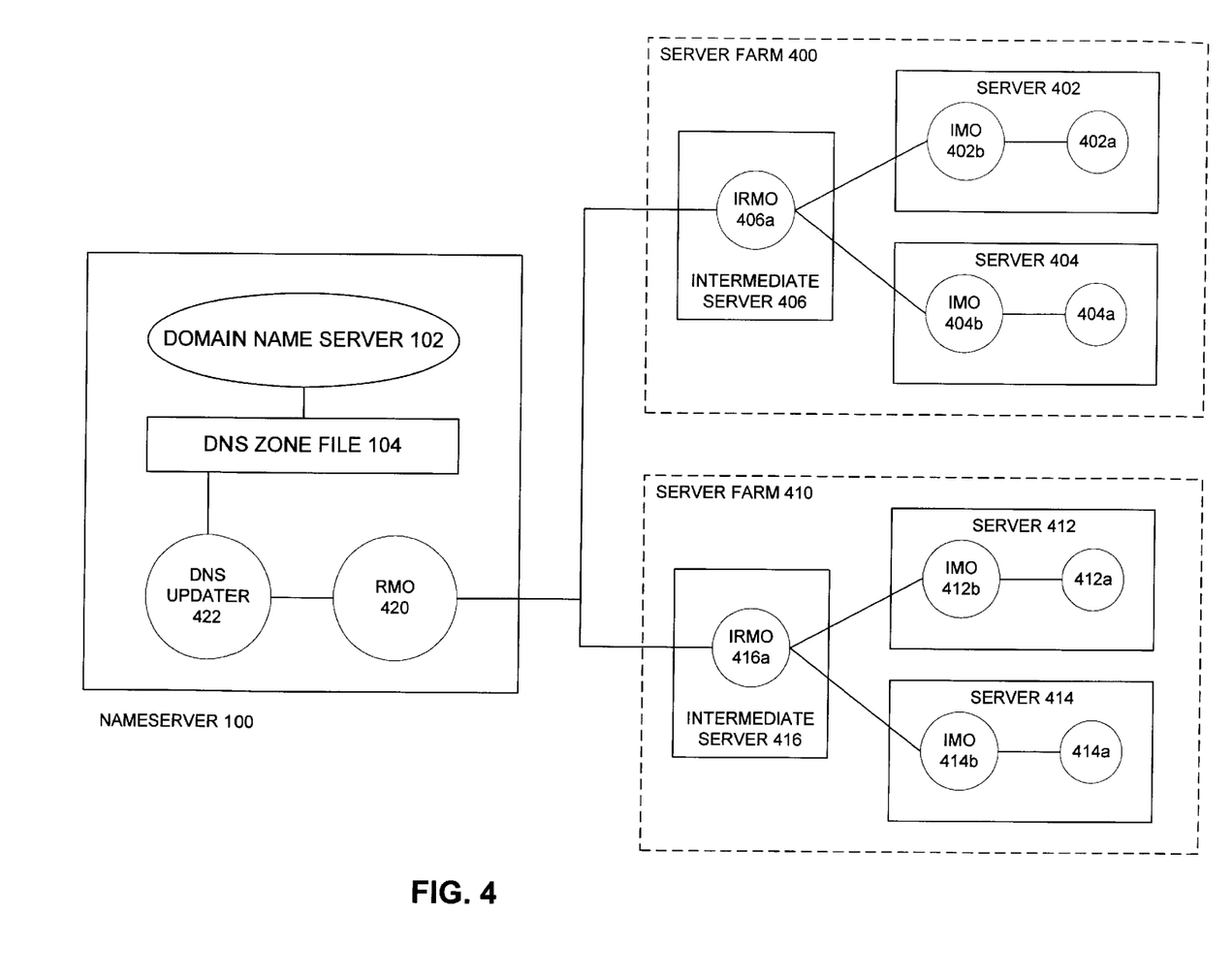
FIG. 4 is a block diagram depicting a method of balancing client requests among geographically dispersed servers in accordance with an embodiment of the present invention.

FIG. 4 depicts an alternative embodiment of the invention in which servers offering a replicated service or application are geographically dispersed. In FIG. 4, server farm 400 represents a first collection of servers offering the replicated service or application and server farm 410 represents a second collection of servers offering the same service. Although server farms are depicted with multiple servers (i.e., servers 402 and 404 in server farm 400 and servers 412 and 414 in server farm 410), a server farm may consist of any number of servers, even one.

Each server farm in the presently described embodiment also includes an intermediate server (i.e., server 406 in server farm 400 and server 416 in server farm 410). One function of an intermediate server in this embodiment is to collect, from the other servers in the farm that are offering the replicated service, the information necessary to select a preferred server. For example, intermediate replicated monitor object (IRMO) 406a is operated on intermediate server 406 to collect data from servers 402 and 404. IRMO 406a thus operates similarly to the RMOs described above, but is illustratively located on a server situated between nameserver 100 and the servers offering the replicated service. As described in conjunction with FIG. 3, status objects (e.g., depicted by numerals 402a, 404a, 412a and 414a) and IMOs (e.g., depicted by numerals 402b, 404b, 412b and 414b) operate on servers 402, 404, 412 and 414.

RMO 420 operates on nameserver 100 to collect data from the IRMOs within each server farm (e.g., IRMO 406 and 416). DNS updater 422 updates zone file 104 to reflect the preferred server identified from the data collected by RMO 420.

In an alternative embodiment of the invention in which a replicated service is offered on multiple servers, one or more of which are local and one or more of which are remote, aspects of the embodiments of the invention depicted in FIGS. 3 and 4 are combined. In this alternative embodiment, intermediate servers with IRMOs are employed in server farms comprising the remote servers to pass data between the remote servers' IMOs and an RMO, as in the embodiment depicted in FIG. 4. Local servers, however, employ IMOs that communicate with the RMO ithout an intervening RMO, as in FIG. 3.

In another alternative embodiment of the invention, load balancing for a replicated service is performed among multiple participating servers wherein one or more of the servers are segregated (e.g., situated in a remote location and/or within a server farm). Within the group of segregated servers, a "local" load balancing policy may be implemented for distributing among the servers all client requests sent to the group (or to any member of the group). In this alternative embodiment, the segregated servers may be considered a single entity for the purposes of a "global" load balancing policy specifying the manner in which all client requests for the replicated service are to be distributed among all participating servers. The global and local policies need not be equivalent (e.g., the global policy may require selection of the closest server (or group of servers) while the local policy may require the least-loaded server).

Figure 5:
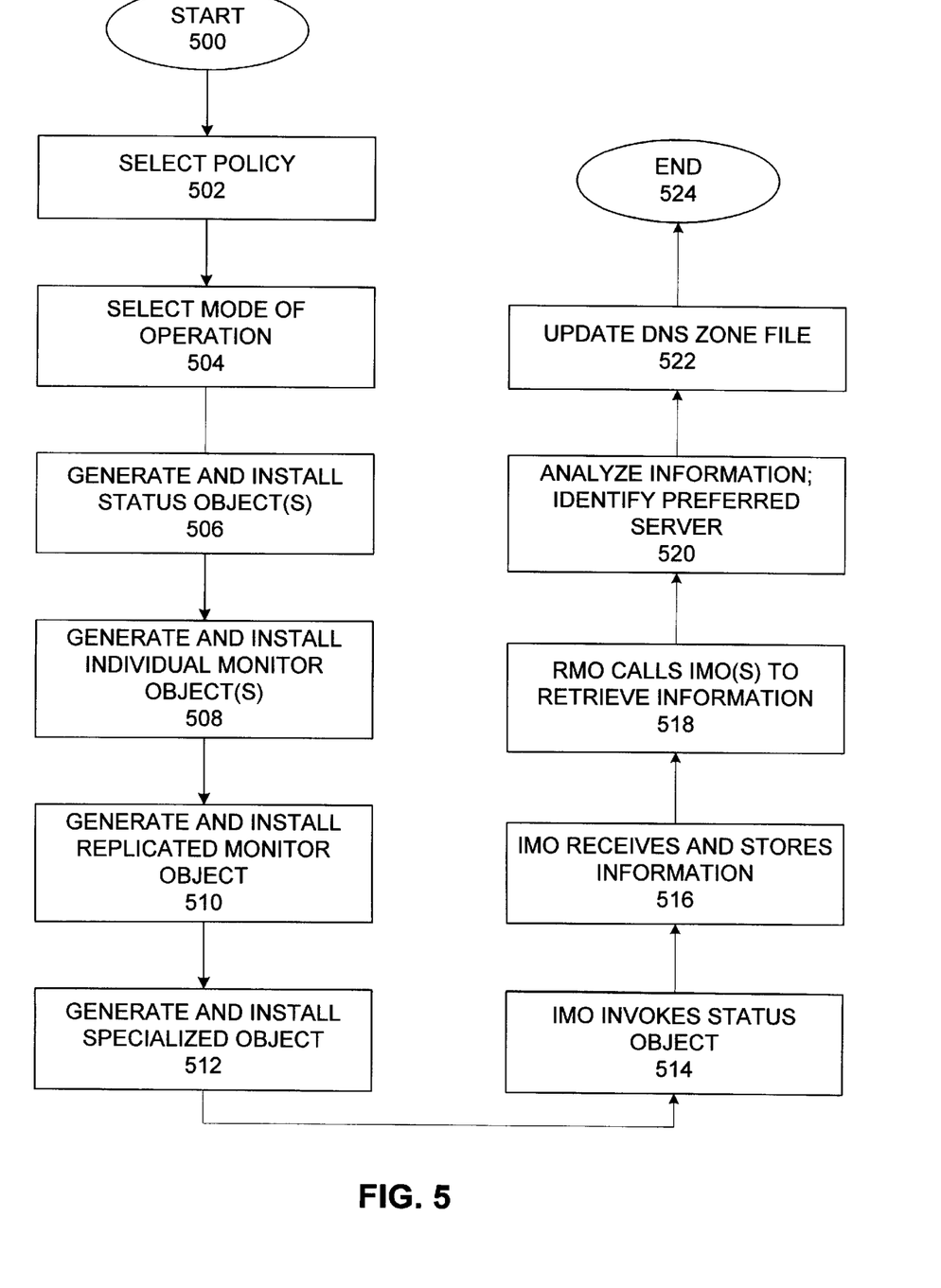
FIG. 5 is a flow chart demonstrating one method of establishing a system for load balancing client requests for a replicated server or application in accordance with an embodiment of the present invention.

With reference now to FIG. 5, an illustrative method of load balancing between multiple instances of a replicated service is depicted in a flow chart. The replicated service illustratively comprises Internet access to data and content (e.g., web pages) through a virtual server name. A DNS server resolves client requests for the virtual server name to an identifier of a server configured to satisfy such requests. Each instance of the replicated service operates on a separate server. State 500 is a start state.

In state 502 a policy to be applied during the load balancing is selected. Illustrative policies in a present embodiment of the invention focus upon the availability or status of the servers offering the replicated service. Such policies include shortest distance (i.e., client requests are to be routed to the server that is closest to the DNS server) and response time (i.e., client requests are to be routed to the server that offers the fastest response or that has the smallest load).

In an alternative embodiment of the invention, policies are application-specific and are based upon specific aspects of an application being load-balanced. For example, where access requests for a database management system (DBMS) are load balanced, illustrative policies may include routing requests to the server on which the fewest DBMS requests have been processed or the server having the fewest connected users or the fewest unfulfilled processing or access requests. For each application for which requests are load-balanced, separate policies may be employed. One skilled in the art will appreciate that this alternative embodiment may require the collection of application-specific data (as opposed to information concerning the host server in general). In such an event, the application may require modification.

In state 504, a mode of operation is chosen. Illustrative modes of operation include intrusive or non-intrusive collection of information concerning a server (or replicated service or application offered by the server).

In state 506, the policy for a replicated service or application is encapsulated into status objects or other computer-readable instructions. For example, if a policy of selecting the server having the fastest response time is selected, and a non-intrusive mode of operation is to be used, a status object is constructed to direct a Ping command (or similar networking test command) from the DNS server to a server offering the replicated service or application. Illustratively, the status object will also be designed to compute an amount of time that elapses between the time the Ping command is issued and a response is received.

In contrast, if an intrusive mode of operation is to be used, a status object reflecting a fastest-response policy is constructed to execute on a server (e.g., a server offering the replicated service) in order to ascertain the number of requests pending on the server.

As discussed above, in a current embodiment of the invention status objects are constructed using an object-oriented programming language. One skilled in the art will recognize that many suitable programming languages and tools exist and that the invention may be implemented using techniques other than object-oriented programming.

In state 508 individual monitor objects are created or invoked. Illustratively, one IMO is generated for each instance of a replicated service. Depending upon whether the replicated service is to be load-balanced intrusively or non-intrusively, the IMO objects are installed on either the individual servers offering the service, the DNS server, or some intermediate computer system. As described above, IMO objects may be configured to invoke one or more status objects and collect and report certain information or data. The collected information may include a server's load (e.g., number of requests waiting and/or being processed), capacity (e.g., the number of requests the server can handle), operational status (e.g., whether the server is up or down), etc.

For effective load balancing, information is collected and processed as described above to identify a preferred server in accordance with a policy. The preferred server then receives requests for the replicated service until a different preferred server is identified. In a present embodiment of the invention, the active policy for a replicated service or application may be changed without disrupting the handling of client requests. Illustratively, this is done by temporarily pausing the operation of IMOs for the service, installing new status objects reflecting the new policy, then resuming the IMOs. Advantageously, the IMO objects need not be altered.

Similarly, a server may easily be removed from load balancing in accordance with the embodiments of the invention discussed herein. A server may, for example, become inoperative or be replaced by another server. Illustratively, an RMO maintains a list (array, linked list, vector, etc.) of all servers participating in the load balancing (e.g., all servers offering an instance of the replicated service or application). By temporarily pausing the RMO, removing a server from the list and restarting the RMO, the RMO will stop attempting to retrieve information from the removed server (i.e., the RMO will stop attempting to communicate with an IMO on the server). Servers may be added to the load-balancing scheme in a similar manner.

In state 510 a replicated monitor object is created for each replicated service or application to be load-balanced. As described above, the RMO is illustratively installed on the DNS server and communicates with IMOs using a suitable format or protocol (e.g., ORB or RPC). In an alternative embodiment in which intermediate servers are employed (e.g., where remote servers or server farms are included), an intermediate RMO is generated for each intermediate server.

Then, in state 512 a specialized object is generated to apply the results of the data collected from the replicated service servers and identify a preferred server. Where, for example, the replicated service includes internet access to web servers, a DNS updater is configured on the DNS server to modify the DNS lookup table (e.g., a zone file) to reflect the server to which requests are to be routed. Similarly, where load balancing is being performed for an application operating in a master/slave relationship (e.g., a master process or server routes requests to slave processes or servers), the specialized object updates a data structure or entry indicating a preferred process or server.

After the various executable objects or program modules are configured and installed, the collection of server/service information can begin. Therefore, in state 514 an IMO invokes or calls a status object, illustratively to determine a server or replicated service's status or to retrieve data concerning the server's load. In a present embodiment of the invention, both the status object and IMO execute on the same computer system (e.g., a server offering a replicated service or application).

In state 516 the status object returns the information it was configured to gather and the IMO stores the information. In state 518 an RMO calls or otherwise communicates with the IMO to retrieve the information it has stored. The RMO may similarly communicate with additional IMOs storing information concerning other servers or instances of the replicated service. Illustratively, the RMO executes on a DNS server and stores the information retrieved from the IMOs for analysis.

In state 520 the information retrieved by the RMO is analyzed in accordance with the selected policy to choose a preferred server. Depending upon the information, the analysis may consist of identifying the server or the instance of a replicated service having the shortest response time, the server that is located the fewest hops from the DNS server, the server having the lightest load (e.g., the number of HTTP (Hypertext Transport Protocol) requests the server has received, perhaps over a particular period of time).

In state 522 the zone file for the DNS server is updated to indicate the preferred server. Illustratively, the update procedure comprises associating a network address of the preferred server with the name of a virtual server/service through which clients access the replicated service or application. In addition, in a present embodiment of the invention, the DNS server is signaled to reload the zone file. State 524 is an end state.

The foregoing descriptions of embodiments of the invention have been presented for purposes of illustration and description only. They are not intended to be exhaustive or to limit the invention to the forms disclosed. Many modifications and variations will be apparent to practitioners skilled in the art. Accordingly, the above disclosure is not intended to limit the invention; the scope of the invention is defined by the appended claims.

What is claimed is:

1. A method of balancing requests for a replicated service among a plurality of servers, wherein the requests are received at a central server, the method comprising:

selecting a policy, said policy comprising one or more factors for selecting a preferred server to receive a request for the replicated service, wherein said one or more factors includes a first factor;

operating a first status module to determine a status of said first factor for a first server;

operating a second status module to determine a status of said first factor for a second server;

receiving said first server status at the central server;

receiving said second server status at the central server;

examining said first server status and said second server status to select a preferred server;

storing an identifier of said preferred server on the central server; and directing a request for the replicated service received at the central server to said preferred server, wherein said directed request is received after said storing.

2. The method of claim 1, further comprising maintaining a server monitor module to receive said first server status from said first status module.

3. The method of claim 2, wherein said policy comprises a second factor for selecting a preferred server, the method further comprising:

operating a third status module to determine a first status of said second factor for said first server;

wherein said server monitor module also receives said first status of said second factor.

4. The method of claim 2, wherein said server monitor module executes on said first server.

5. The method of claim 2, wherein said server monitor module executes on the central server.

6. The method of claim 1, further comprising maintaining a central monitor module for retrieving said first server status and said second server status.

7. The method of claim 6, wherein said central monitor module executes on the central server.

8. The method of claim 1, wherein said operating a first status module comprises invoking a first status module residing on the first server.

9. The method of claim 1, wherein said operating a first status module comprises pinging a first server by the central server and operating a second status module comprises pinging a second server by the central server.

10. The method of claim 1, further comprising:

selecting a local policy for a subset of the plurality of servers, said local policy specifying a second factor for selecting a server to receive a request for the replicated service.

11. The method of claim 1, wherein for each of said plurality of servers, a status of each of said one or more factors is determined by a separate status module.

12. The method of claim 1, wherein said operating a first status module comprises issuing a Connect command to a first server by the central server and operating a second status module comprises issuing a Connect command to a second server by the central server.

13. A method of load balancing requests for a replicated service received at a central server among a set of servers, comprising:

selecting a policy for directing a request for the replicated service to a preferred server, wherein said policy specifies a server factor for selecting said preferred server from the set of servers;

executing a first status object on the central server to determine a first status of said server factor for a first server in the set of servers;

executing a first server monitor object on the central server to receive said first status;

executing a central monitor object on the central server to receive multiple statuses of said server factor for multiple servers in the set of servers, including said first status;

examining said multiple statuses to select a preferred server; and updating the central server to identify said preferred server.

14. The method of claim 13, wherein the set of servers includes a first subset, the method further comprising:

configuring an intermediate central monitor object on an intermediate server to collect one or more statuses of said server factor for one or more members of said first subset; and receiving said one or more statuses at the central server from said intermediate central monitor object.

15. The method of claim 14, further comprising selecting a local policy for balancing requests for the replicated service among the members of the first subset according to a local server factor.

16. The method of claim 15, wherein said local server policy is different from said policy.

17. The method of claim 13, wherein said central server comprises a domain name server, further comprising updating a lookup table associated with the domain name server to associate said preferred server with the replicated service.

18. The method of claim 17, wherein said lookup table comprises a zone file and said updating comprises storing a network address of said preferred server to facilitate directing a future request for the replicated service from the central server to said preferred server.

19. An apparatus for balancing requests for a replicated service among multiple servers, wherein the requests are received at a central server, comprising:

a first server configured to operate a first instance of the replicated service;

a second server configured to operate a second instance of the replicated service;

a first status module on the central server-configured to determine a first status of said first server;

a second status module on the central server-configured to determine a second status of said second server;

a first server monitor module on the central server configured to invoke said first status module and receive said first status;

a second server monitor module on the central server configured to invoke said second status module and receive said second status;

a central monitor module configured to receive said first status and said second status;

a preferred server identifier configured to identify a preferred server for receiving a future request for the replicated service; and an update module configured to update said preferred server identifier to indicate one of said first server and said second server to receive a request for the replicated service.

20. The apparatus of claim 19, wherein said first status module is a Ping command issued by the central server to said first server.

21. The apparatus of claim 19, wherein the central server comprises said central monitor module and said update module.

22. The apparatus of claim 19, further comprising a server farm, said server farm comprising:

one or more servers; and an intermediate central monitor module configured to receive a status of one of said one or more servers and communicate said status to said central monitor module.

23. The apparatus of claim 19, wherein said first status module is a Connect command issued by the central server to said first server.

24. An apparatus for load balancing requests for a replicated service received at a central server, comprising:

a first status determination means for determining a first status of a first server offering the replicated service;

a second status determination means for determining a second status of a second server offering the replicated service;

a first server monitor means for invoking said first status determination means;

central monitor means for receiving said first status and said second status;

server selection means for selecting a preferred server from one of said first server and said second server; and updating means for storing an identifier of said preferred server on the central server;

wherein one or more requests for the replicated service received after said updating are directed to said preferred server.

25. The apparatus of claim 24, wherein said first status determination means and said first server monitor means are located on said first server.

26. A method of load balancing requests for a replicated service received at a central server among a set of servers, comprising:

selecting a policy for directing a request for the replicated service to a preferred server, wherein said policy specifies a server factor for selecting said preferred server from the set of servers;

configuring a first status object on a first server in the set of servers to determine a first status of said server factor for said first server;

configuring a first server monitor object on said first server to receive said first status;

configuring a central monitor object on the central server to receive multiple statuses of said server factor for multiple servers in the set of servers, including said first status;

examining said multiple statuses to select a preferred server;

updating the central server to identify said preferred server; and directing a request for the replicated service received at the central server to said preferred server, wherein said directed request is received after said updating.

27. The method of claim 26, further comprising:

invoking said first status object;

storing said first status with said first server monitor object; and receiving said first status at the central server, by said central monitor object, from said first server monitor object.

28. The method of claim 26, wherein the set of servers includes a first subset, the method further comprising:

configuring an intermediate central monitor object on an intermediate server within the first subset to collect one or more statuses of said server factor for one or more members of the subset; and receiving said one or more statuses at the central server from said intermediate central monitor object.

29. The method of claim 28, further comprising selecting a local policy for balancing requests for the replicated service among the members of the subset according to a local server factor, wherein said local server factor is different from said server factor.

30. A computer readable storage medium storing instructions that, when executed by a computer, cause the computer to perform a method for balancing requests for a replicated service among a plurality of servers, wherein the requests are received at a central server, the method comprising:

selecting a policy, said policy specifying a server-selection factor for selecting a preferred server to receive a request for the replicated service;

invoking a first status module to determine a first server-selection factor of a first server;

invoking a second status module to determine a second server-selection factor of a second server;

receiving said first server-selection factor at the central server;

receiving said second server-selection factor at the central server;

examining said first server-selection factor and said second server-selection factor to select a preferred server;

storing an identifier of said preferred server on the central server; and directing a request for the replicated service received at the central server to said preferred server, wherein said directed request is received after said storing.

* * * * *